US008184208B2

United States Patent
Tang et al.

(10) Patent No.: US 8,184,208 B2
(45) Date of Patent: May 22, 2012

(54) METHOD AND APPARATUS FOR PROCESSING VIDEO DATA

(75) Inventors: Sen-Huang Tang, Hsinchu (TW); Wen-Tsai Liao, Taipei Hsien (TW)

(73) Assignee: Realtek Semiconductor Corp., HsinChu (TW)

( * ) Notice: Subject to any disclaimer, the term of this patent is extended or adjusted under 35 U.S.C. 154(b) by 1374 days.

(21) Appl. No.: 11/763,458

(22) Filed: Jun. 15, 2007

(65) Prior Publication Data

US 2008/0043154 A1 Feb. 21, 2008

(30) Foreign Application Priority Data

Jun. 19, 2006 (TW) ................................ 95121882 A

(51) Int. Cl.
*H04N 5/14* (2006.01)
(52) U.S. Cl. ........................................ 348/700; 348/701
(58) Field of Classification Search .................. 348/700, 348/701
See application file for complete search history.

(56) References Cited

U.S. PATENT DOCUMENTS

| 6,580,463 | B2 * | 6/2003 | Swartz | 348/558 |
| 6,859,237 | B2 | 2/2005 | Swartz | |
| 2003/0095205 | A1 * | 5/2003 | Orlick et al. | 348/448 |
| 2005/0243216 | A1 * | 11/2005 | Salzer et al. | 348/701 |
| 2005/0259950 | A1 * | 11/2005 | Landsiedel et al. | 386/46 |
| 2006/0044476 | A1 * | 3/2006 | Lee et al. | 348/700 |
| 2007/0188662 | A1 * | 8/2007 | Winger et al. | 348/701 |

FOREIGN PATENT DOCUMENTS

CN 1694496 A 11/2005

\* cited by examiner

*Primary Examiner* — Mehrdad Dastouri
*Assistant Examiner* — Mohammed Rahaman
(74) *Attorney, Agent, or Firm* — Winston Hsu; Scott Margo

(57) ABSTRACT

A method for processing video data including a plurality of fields is disclosed. The method includes: dividing the plurality of fields into a plurality of image blocks; examining each image block of a target field to determine whether each image block of the target field corresponds to a film mode or a non-film mode, wherein the target field is one of the plurality of fields; examining each image block of the target field that corresponds to the film mode to determine whether each image block corresponds to a pure film mode or a mix film mode; and utilizing a specific image processing mechanism to process each of the plurality of image blocks.

6 Claims, 3 Drawing Sheets

METHOD AND APPARATUS FOR PROCESSING VIDEO DATA

BACKGROUND OF THE INVENTION

1. Field of the Invention

The invention relates to a method for processing video data and apparatus thereof, and more specifically, to a method for examining image blocks corresponding to a pure film mode or a mix film mode.

2. Description of the Prior Art

The traditional interlaced scanning shows an image frame of a film by interlacing two fields contained in that image frame. Because of physiologic photogene, observers won't feel odd regarding the image shown. The two fields are the odd field which is composed of odd scanning lines, and the even field which is composed of even scanning lines.

A new technique called progressive scanning, which is also referred as non-interlaced scanning, combines the two fields of one frame and then scans the frame progressively with doubled horizontal scanning frequency.

Nowadays, the film modes are determined by the relationship of each field in video data (i.e. 2:2 Pull Down or 3:2 Pull down). The de-interlacing will be performed after film mode is determined. However, when a movie is played, marquee captions, fixed text or trademarks sometimes show up on screen due to advertisements or special effects. In other words, a lot of video data is not in pure film mode, indicating that the film mode and non-film mode exist in one movie simultaneously. This kind of video data belongs to a mix film mode. Using the traditional detecting techniques to detect the mix mode movie will lead to two results. The first result is that the film mode content is not detected, so it is not processed through the film mode protocol. As a result, the quality of the film mode content is deteriorated. The second result is that portions of non-film mode is referred wrongly as film mode, and is therefore processed through a film mode mechanism. Accordingly, sawtooth or blur marquee caption is created.

SUMMARY OF THE INVENTION

It is therefore one of the objectives of the present invention to provide a method and an apparatus to process the mix film mode, in particular, to detect not only the pure film mode but also the mix film mode. Furthermore, the present invention is able to process portions of the mix film mode video data that correspond to pure film mode and mix film mode by using pure film mode processing mechanism and mix film mode processing mechanism respectively, in order to solve the above-mentioned problems.

A method for processing video data is disclosed, the video data includes a plurality of fields. The method comprising: Dividing the plurality of field into a plurality of image blocks; examining each image block of a target field to determine whether each image block of the target field corresponds to a film mode or a non-film mode, wherein the target field is one of the plurality of fields; examining each image block of the target field that corresponds to the film mode to determine whether each image block corresponds to a pure film mode or a mix film mode; and utilizing a specific image processing mechanism to process each of the plurality of image blocks.

An apparatus for processing a video data is disclosed, the video data includes a plurality of fields. The apparatus comprising: an image divider, for dividing the plurality of field into a plurality of image blocks; a film mode detector, coupled to the image divider, for examining each image block of a target field to determine whether each image block of the target field corresponds to a film mode or a non-film mode, wherein the target field is one of the plurality of fields; a film mode discriminator, coupled to the film mode detector, for examining each image block of the target field that corresponds to the film mode to determine whether each image block corresponds to a pure film mode or a mix film mode; and a plurality of processing unit, coupled to the film mode detector and the film mode discriminator, for utilizing a specific image processing mechanism to process each of the plurality of image blocks.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
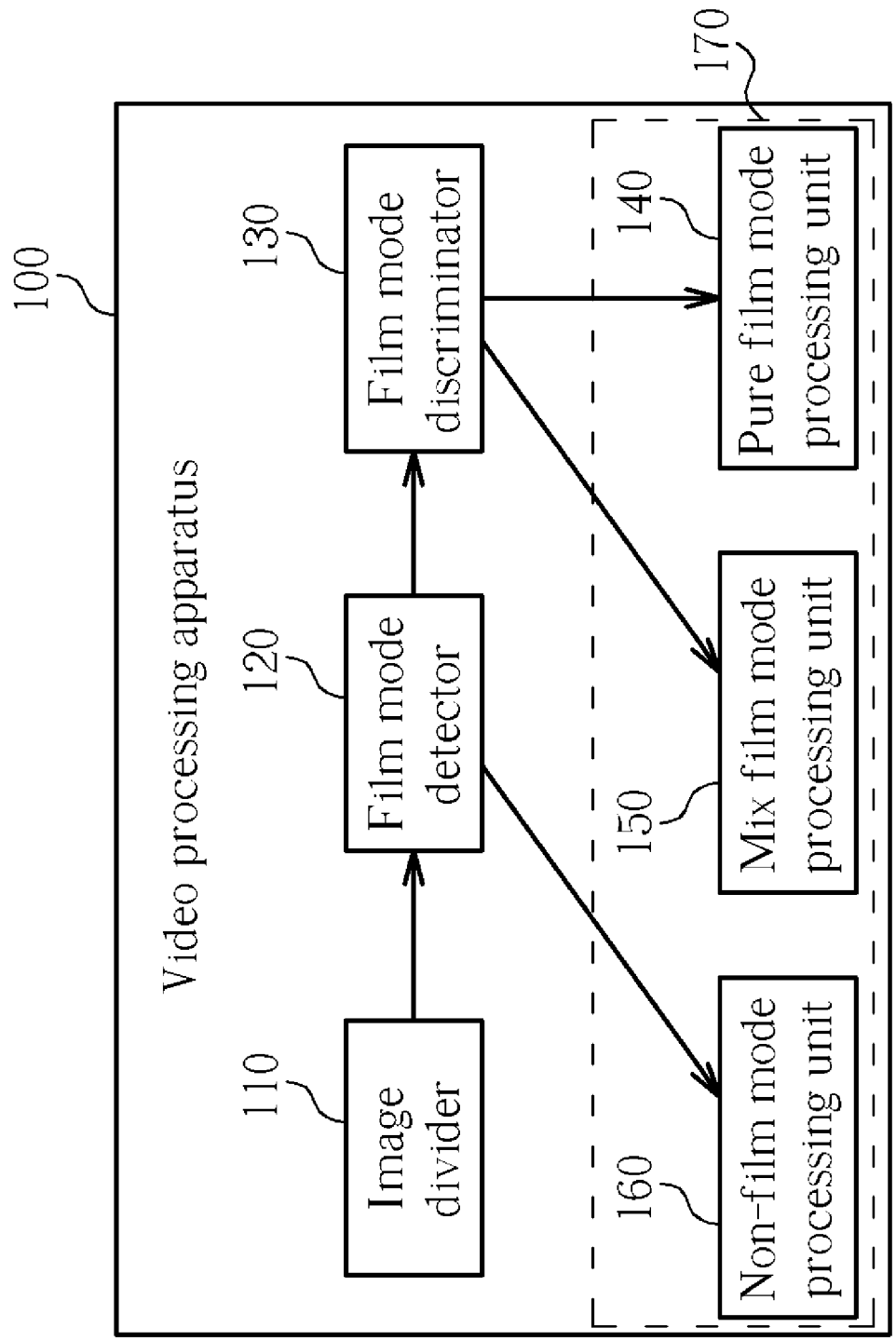
FIG. 1 is a functional block diagram of a video processing apparatus of the present invention.

Please refer to FIG. 1. FIG. 1 is a functional block diagram of a video processing apparatus 100 of the present invention. The video processing apparatus 100 is utilized for processing video data, the video data including a plurality of fields, the processing apparatus 100 including an image divider 110, a film mode detector 120, a film mode discriminator 130, and a plurality of processing units 170. The image divider 110 is utilized for dividing the plurality of fields into a plurality of image blocks. The film mode detector 120, coupled to the image divider 110, for film mode detection is implemented by examining each image block of a target field to determine whether each image block of the target field corresponds to either a film mode or a non-film mode, where a film mode detected by the film mode detection may include at least 2:2 pull down or 3:2 pull down. In this embodiment, the film mode discriminator 130 is implemented with a sawtooth detector, the film mode discriminator 130 is coupled to the film mode detection 120, for implementing sawtooth detection for each image block that has been previously determined to be in the film mode by the film mode detector 120. If the image block includes sawtooth, then the image block that has been previously determined as film mode is determined to be corresponding to the mix film mode. On the other hand, if the image block doesn't include sawtooth, the image block is then determined to be corresponding to a pure film mode. The film mode discriminator 130 further examines the detection result detected by the film mode detector 120. The plurality of processing units 170 include a non-film mode processing unit 160, a pure film mode processing unit 140 and a mix film mode processing unit 150. The non-film mode processing unit 160 is coupled to the film mode detector 120, and executes a non-film mode image processing mechanism to process the specific image block when the film mode detector 120 determines that the specific image block corresponds to a non-film mode. The pure film mode processing unit 140 is coupled to the film mode discriminator 130, and executes the pure film mode image processing mechanism to process the specific image block when the specific image block of the target field corresponds to a pure film mode. Moreover, the mix film mode processing unit 150 is coupled to the film mode discriminator 130, and executes the mix film mode image processing mechanism to process the specific image block when the specific image block of the target field is determined to be in a pure film mode while having sawtooth.

The film mode discriminator 130, which is used to differentiate pure film mode and mix film mode, is not limited to the sawtooth detector. Any detector which is able to differentiate pure film mode and mix film mode can be applied in the present invention.

Figure 2:
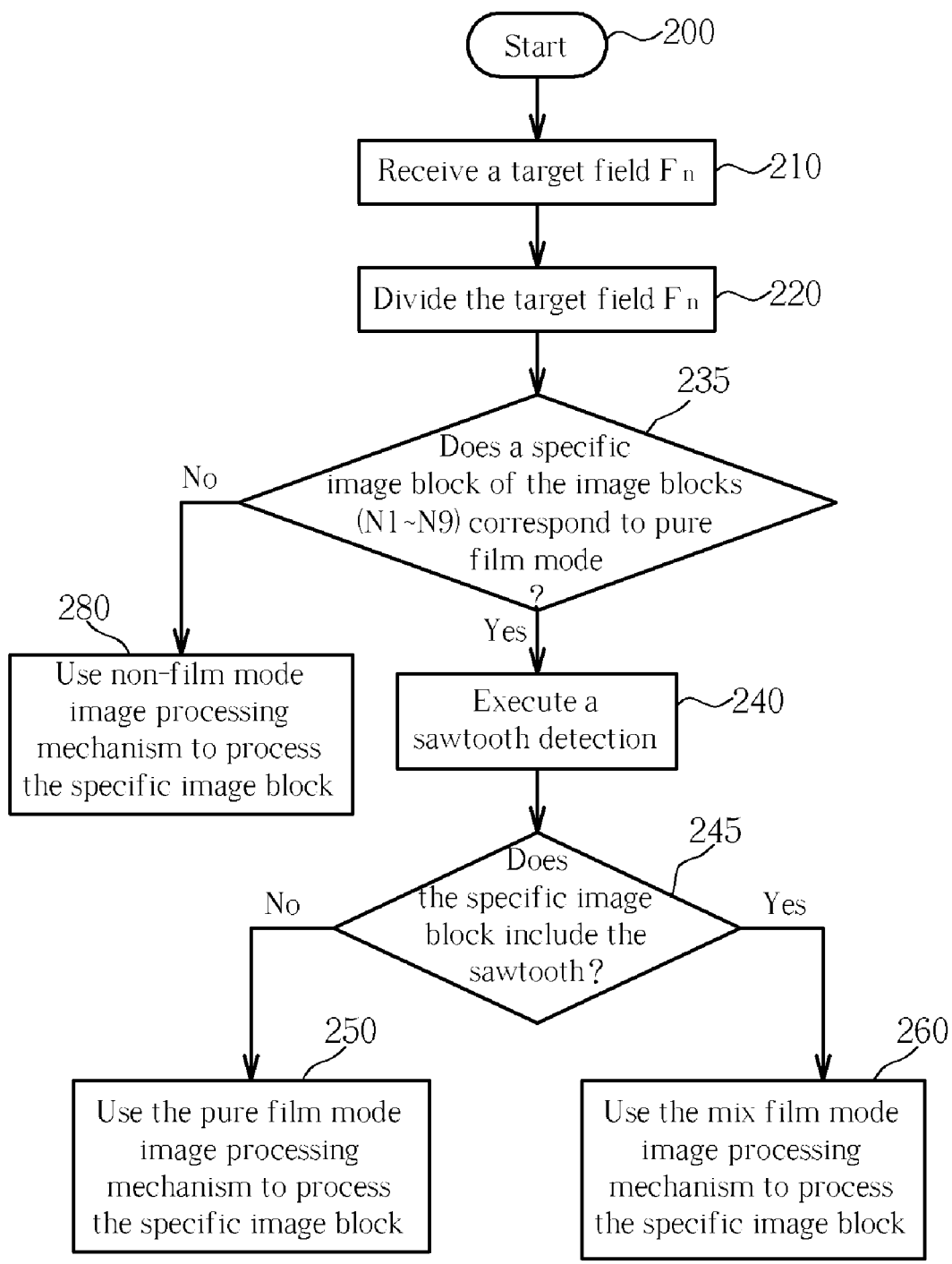
FIG. 2 is a flow chart of a method for processing a video data according to the present invention.

Please refer to FIG. 2. FIG. 2 is a flow chart of a method for processing video data according to the present invention. The processing of video data includes the following steps:

Step 220: Start.
Step 210: Receive a target field $F_n$ from the video data.
Step 220: Divide the target field $F_n$ into 9 image blocks N1~N9.
Step 235: Does a specific image block of the image blocks (N1~N9) correspond to pure film mode? If Yes, go to step 240; otherwise, go to step 280.
Step 240: Execute sawtooth detection for the specific image block which has been previously determined as film mode.
Step 245: Does the specific image block include sawtooth? If yes, go to step 260; otherwise, go to step 250.
Step 250: Use pure film mode image processing mechanism to process the specific image block.
Step 260: Use mix film mode image processing mechanism to process the specific image block;
Step 280: Use non-film mode image processing mechanism to process the specific image block.

To better illustrate the operation of the present invention, please consider the following example.

Figure 3:
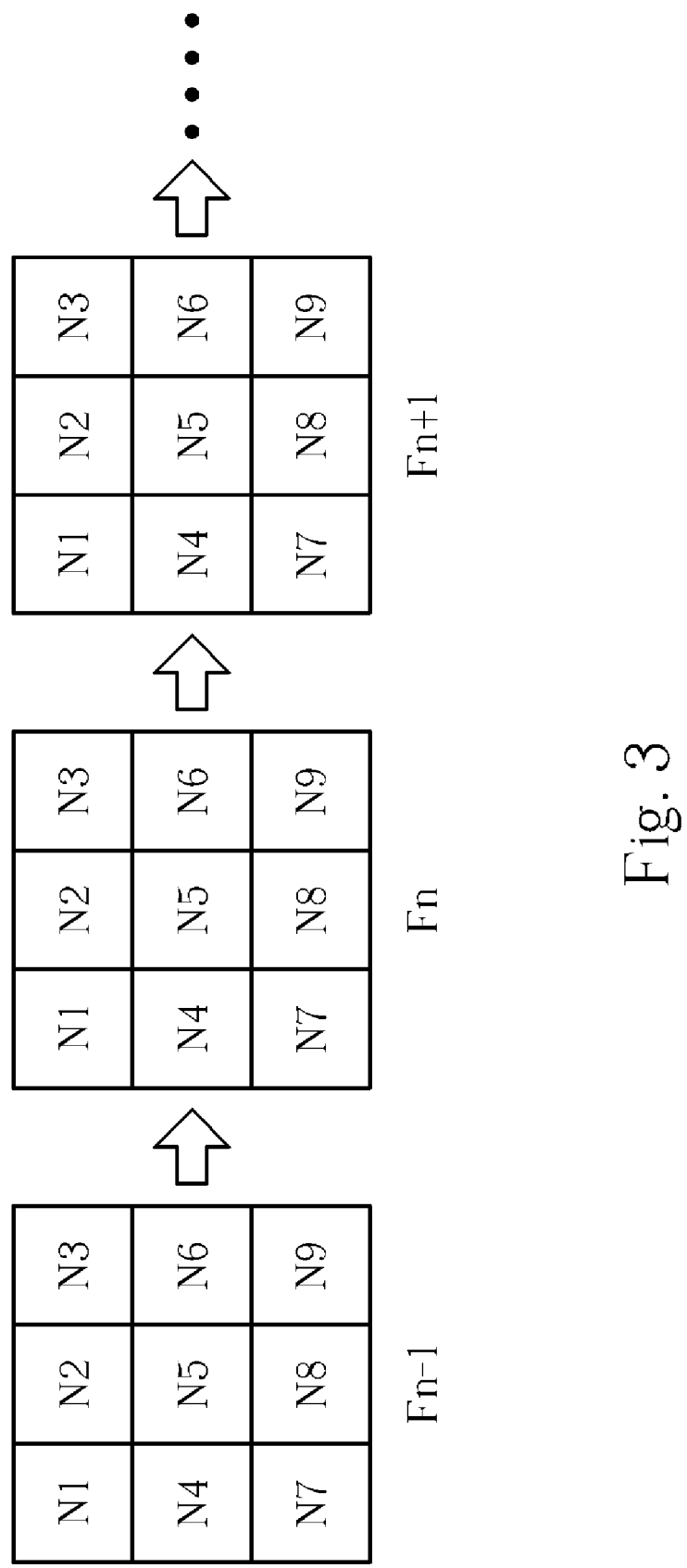
FIG. 3 is the schematic diagram illustration of processing video data according the embodiment of the present invention.

Please refer to FIG. 3. FIG. 3 is the schematic diagram illustration of processing video data according an embodiment of the present invention. As shown in FIG. 3, when the image divider 110 receives a target field $F_n$ from the video data, it will divide it into 9 image blocks N1~N9. The film mode detector 120 will then examine image blocks N1~N9. Take image block N1 as an example. The film mode detector 120 will examine a plurality of consecutive adjacent fields $(\ldots F_{n-2}, F_{n-1}, F_{n+1}, F_{n+2} \ldots)$ within locations corresponding to where the N1 image block situates in the target field. The film mode detector 120 will further examine whether the N1 image block of the target field corresponds to either 2:2 pull down or 3:2 pull down, so to refer the image block N1 to the film mode or the non-film mode. If the image block N1 is referred to a non-film mode, the film mode detector 120 will direct the image block N1 to the non-film mode processing unit 160 which performs a non-film mode image processing mechanism.

If the image block N1 is referred to the film mode, the film mode discriminator 130 will examine adjacent fields ($F_{n-1}$, $F_{n+1}$) of image block N1 to implement sawtooth detection. If the image block N1 of the target field $F_n$ includes sawtooth, it will be referred to the mix film mode by the film mode discriminator 130 and is directed to the mix film mode processing unit 150 which will perform the mix film mode image processing mechanism. On the other hand, if the image block N1 of target field $F_n$ doesn't include sawtooth, it will be referred as a pure film mode by the film mode discriminator 130 and is directed to the pure film mode processing unit 140 which will perform the pure film mode image processing mechanism. Other image blocks (N2~N9) will be processed in the same way, so that the present invention can process the pure film mode content of the video data with pure film mode mechanism, process the mix film mode content with the mix film mode mechanism, and process non-film mode content with non-film mode mechanism. In other words, each image blocks can be specifically processed according to their film mode, so that the best quality and stability of image can be obtained.

Please note that dividing a field into 9 image blocks is just an embodiment of the present invention. That is to say, according to the requirement of the design, the image divider 110 can divide a field into other numbers of image blocks. For example, in other embodiments of the present invention, if considering marquee captions that often appear on the lateral side or superior/inferior side of the screen, the present invention will tend to divide the field in a horizontal or vertical fashion. The present invention can also divide a field based on the probability distribution of the location of the marquee captions.

The present invention not only detects the pure film mode content but also the mix film mode content. Furthermore, it can process portions of the mix film mode content that correspond to pure film mode or non-film mode according to the mode of content. Therefore, quality and stability of a movie is improved by the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for processing video data, the video data including a plurality of fields, the method comprising:
    dividing each of the plurality of fields into a plurality of image blocks;
    examining each image block of a target field to determine whether each image block of the target field corresponds to a film mode or a non-film mode, wherein the target field is one of the plurality of fields;
    examining each image block of the target field that corresponds to the film mode to determine whether each image block corresponds to a pure film mode or a mix film mode; and
    utilizing a specific image processing mechanism to process each of the plurality of image blocks, and the step of using the specific image processing mechanism to process each of the image blocks comprises:
        utilizing a pure film mode image processing mechanism to process a specific image block when the specific image block of the target field corresponds to the pure film mode;
        utilizing a mix film mode image processing mechanism to process a specific image block when the specific image block of the target field corresponds to the mix film mode; and
        utilizing a non-film mode image processing mechanism to process a specific image block when the specific image block of the target field corresponds to the non-film mode;
    wherein the step of examining each image block of the target field that corresponds to the film mode to determine whether each image block corresponds to a pure film mode or a mix film mode is implemented by executing a sawtooth detection; if the image block includes sawtooth, the image block is determined to be corresponding to the mix film mode; and if the image block does not include the sawtooth, the image block is determined to be corresponding to the pure film mode.

2. The method of claim 1, wherein the step of examining each image block of a target field to determine whether each image block of the target field corresponds to a film mode or a non-film mode is implemented by executing a film mode detection, wherein a film mode detected by the film mode detection includes at least a 2:2 pull down mode or a 3:2 pull down mode.

3. The method of claim 1, wherein each field is divided into N image blocks with M kinds of shapes, where N is a positive integer and M is less than or equal to N.

4. An apparatus for processing video data, the video data including a plurality of fields, the apparatus comprising:
- an image divider, for dividing each of the plurality of fields into a plurality of image blocks;
- a film mode detector, coupled to the image divider, for examining each image block of a target field to determine whether each image block of the target field corresponds to a film mode or a non-film mode, wherein the target field is one of the plurality of fields;
- a film mode discriminator, coupled to the film mode detector, for examining each image block of the target field that corresponds to the film mode to determine whether each image block corresponds to a pure film mode or a mix film mode; and
- a plurality of processing units, coupled to the film mode detector and the film mode discriminator, for utilizing a specific image processing mechanism to process each of the plurality of image blocks, wherein the processing units comprise:
  - a pure film mode processing unit, coupled to the film mode discriminator, for utilizing a pure film mode image processing mechanism to process a specific image block when the specific image block of the target field corresponds to the pure film mode;
  - a mix film mode processing unit, coupled to the film mode discriminator, for utilizing a mix film mode image processing mechanism to process a specific image block when the specific image block of the target field corresponds to the mix film mode; and
  - a non-film mode processing unit, coupled to the film mode detector, for utilizing a non-film mode image processing mechanism to process a specific image block when the specific image block of the target field corresponds to the non-film mode;
- wherein the film mode discriminator is a sawtooth detector, for determining whether the image blocks of the target field that corresponds to the film mode includes sawtooth, if the image block includes sawtooth, the film is a mix film mode, if the image block does not include the sawtooth, the film is a pure film mode.

5. The apparatus of claim 4, wherein the film mode detector performs a film mode detection for examining each image block of the target field to determine whether each image block of the target field corresponds to the film mode or the non-film mode, and a film mode detected by the film mode detection includes at least one of a 2:2 pull down mode and a 3:2 pull down mode.

6. The apparatus of claim 4, wherein each field is divided into N image blocks with M kinds of shapes, where N is a positive integer and M is less than or equal to N.

* * * * *